United States Patent
Dentzer

(10) Patent No.: US 8,209,281 B2
(45) Date of Patent: Jun. 26, 2012

(54) SYSTEMS AND METHODS FOR PROCESSING DATA OBJECTS

(75) Inventor: Ralf Georg Friedrich Dentzer, Hockenheim (DE)

(73) Assignee: SAP AG, Walldorf (DE)

( * ) Notice: Subject to any disclaimer, the term of this patent is extended or adjusted under 35 U.S.C. 154(b) by 273 days.

(21) Appl. No.: 12/414,901

(22) Filed: Mar. 31, 2009

(65) Prior Publication Data

US 2010/0250506 A1 Sep. 30, 2010

(51) Int. Cl.
*G06F 17/00* (2006.01)
(52) U.S. Cl. .................. 707/608; 707/690; 707/695
(58) Field of Classification Search .................. 707/690, 707/695, 608
See application file for complete search history.

(56) References Cited

U.S. PATENT DOCUMENTS

| | | | | |
|---|---|---|---|---|
| 5,680,573 | A * | 10/1997 | Rubin et al. | 711/129 |
| 6,694,336 | B1 * | 2/2004 | Multer et al. | 1/1 |
| 7,296,025 | B2 * | 11/2007 | Kung et al. | 707/608 |
| 2003/0120873 | A1 * | 6/2003 | Kanaley | 711/141 |
| 2003/0208490 | A1 * | 11/2003 | Larrea et al. | 707/9 |
| 2005/0097149 | A1 * | 5/2005 | Vaitzblit et al. | 707/202 |
| 2005/0108481 | A1 * | 5/2005 | Iyengar et al. | 711/141 |
| 2006/0263134 | A1 * | 11/2006 | Beppu | 400/62 |

* cited by examiner

*Primary Examiner* — Shahid Alam
*Assistant Examiner* — Muluemebet Gurmu
(74) *Attorney, Agent, or Firm* — Kenyon & Kenyon LLP

(57) ABSTRACT

A system and method for processing data objects is provided. The system and method may comprise a user interface module, a fast data provider module, and a transaction provider module, which modules are configured to exchange data and which may be distributed over a plurality of interconnected servers. Data objects may be statelessly read from a database by the fast data provider module and, after an amendment of the data via the user interface module, statefully saved by the transaction provider module.

12 Claims, 7 Drawing Sheets

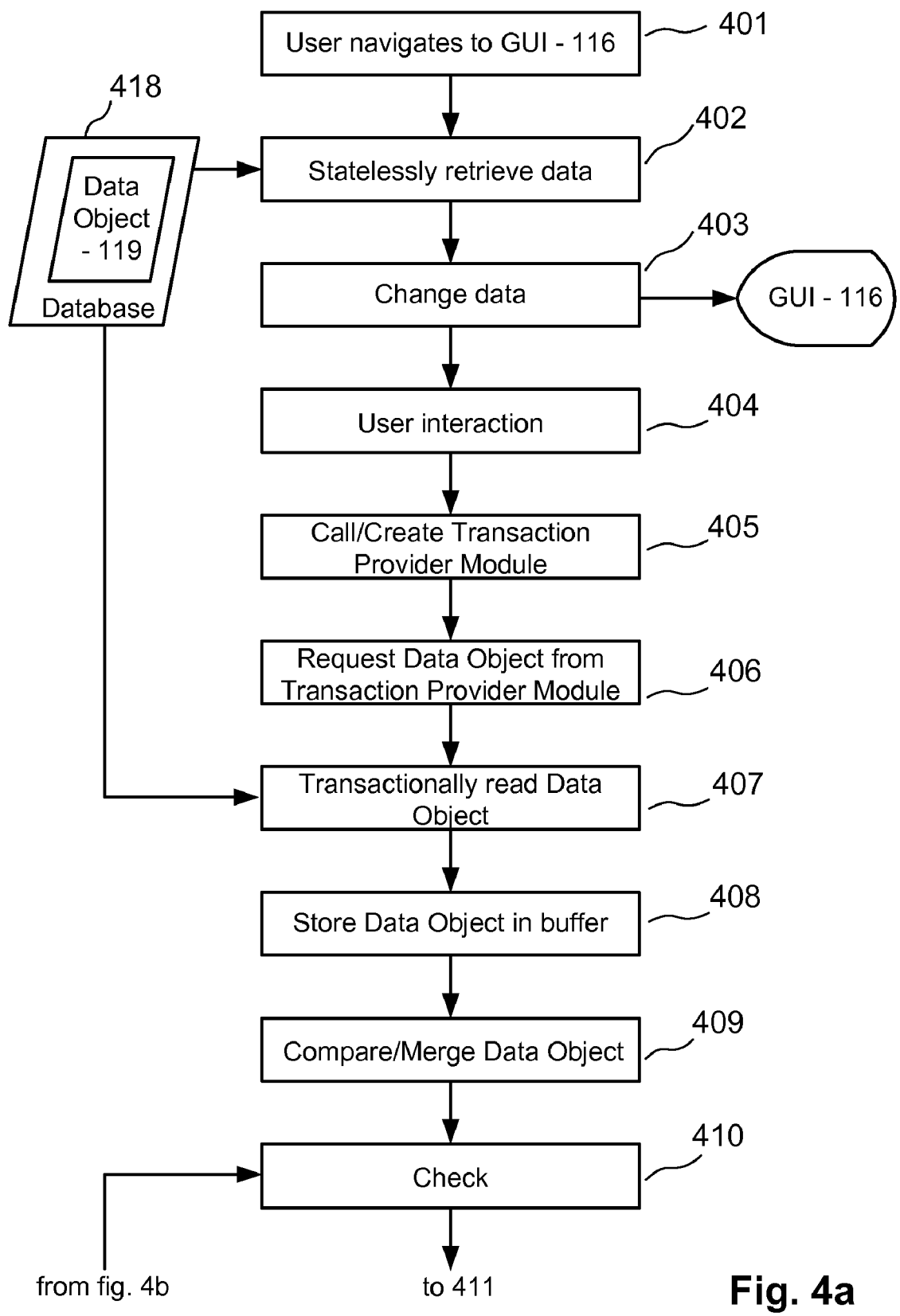

SYSTEMS AND METHODS FOR PROCESSING DATA OBJECTS

TECHNICAL FIELD

The technical field of the present invention is in the area of electronic data processing. More particularly, the invention relates to methods, computer programs, products and systems including architecture and user interfaces for large scale business applications, such as an enterprise resource planning (ERP) application.

BackgroundComputer systems in modern business application environments offer sophisticated user interfaces providing vast amounts of information to users to support improving decision making. To provide this functionality and permit users to easily correct, update, complete or add the information displayed in these interfaces, current approaches provide the information through data obtained, from a transactional context, in a "backend." Often the backend of a business application consists of several layers that offer generic functionality. All of these layers have to keep the state and buffering in case of transactional access. This approach has a major impact on the overall performance of the applications: in the backend, state and transactional buffering of all the information has to be preserved which consumes system resources: memory, processing time, communication steps.

BRIEF DESCRIPTION OF THE DRAWINGS

The accompanying drawings, which are incorporated in and constitute a part of this specification, illustrate embodiments of the invention and, together with the description, explain the principles of the invention. In the drawings.

FIGS. 4a and 4b show a flow diagram for illustrating a second process consistent with an embodiment of the invention.

DETAILED DESCRIPTION OF THE EMBODIMENTS

Figure 1:
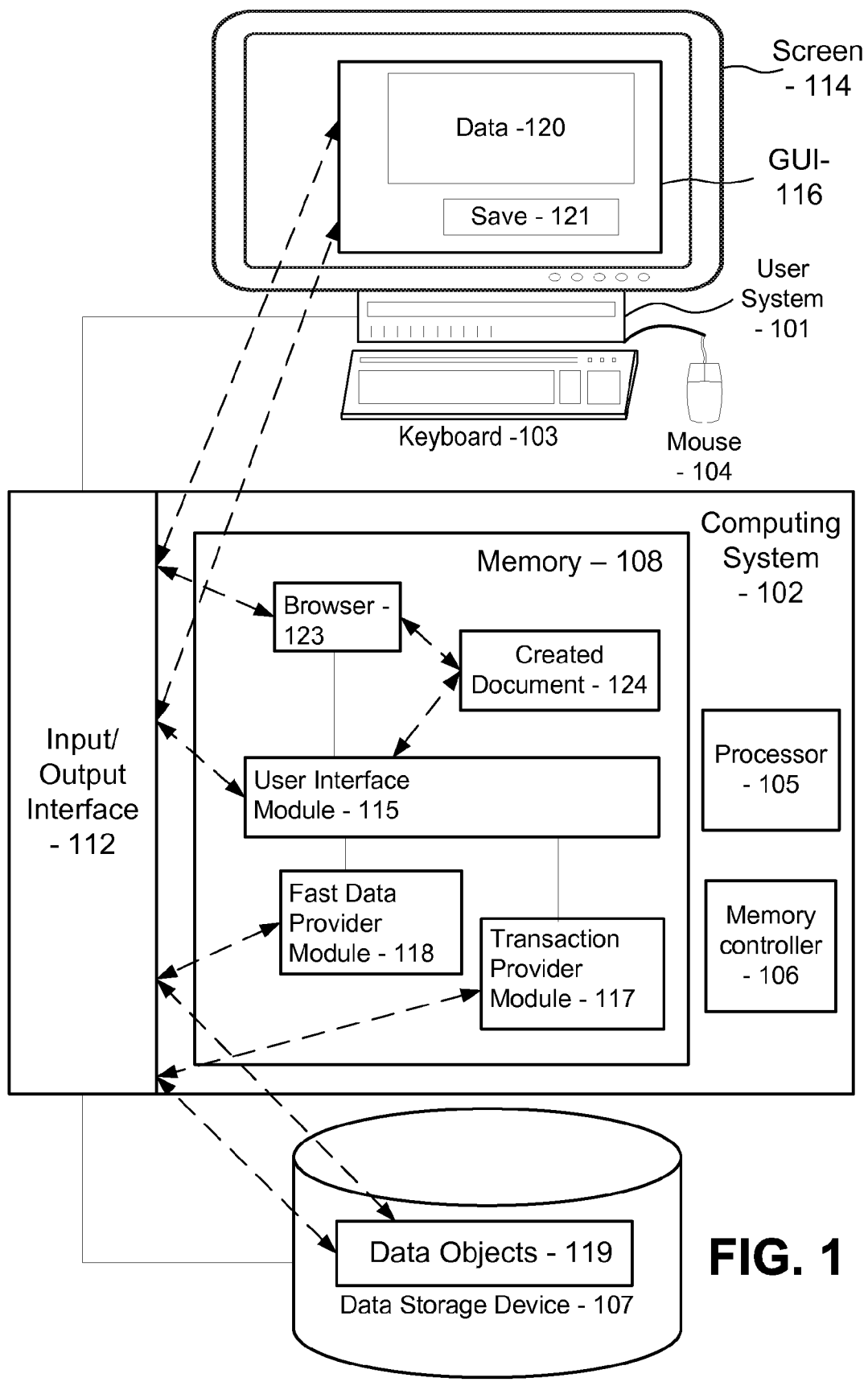
FIG. 1 is a block diagram for illustrating a first implementation of an exemplary computer system consistent with an embodiment of the invention.

In view of the foregoing, it is a primary object of the present invention to provide methods, computer programs, products and systems including architecture and user interface for large scale business applications, such as an enterprise resource planning (ERP) application.

The architecture comprises a user interface module, a fast data provider module and a transaction provider module, which modules are configured to exchange data and which may be distributed over a plurality of interconnected servers. Data objects may be statelessly read from a database by the fast data provider module and, after an amendment of the data via the user interface module, statefully saved by the transaction provider module.

In accordance with the principles of the invention, as embodied and broadly described herein, an embodiment of the invention provides a computer system for processing a data object comprising: a storage device containing a database for storing a plurality of data objects; a user interface module configured to create a document to be presented to a user via a graphical user interface on a screen; a fast data provider module configured to statelessly read upon request from the user interface module the data object from the database by treating the request as an independent transaction and provide the data object to the user interface module; a transaction provider module configured to read the data object from the user interface module, to transactionally read or store the data object from or in the database by preserving consistency and atomicity, and to perform a consistency check between the data object read from the user interface module and the database; wherein the user interface module is further configured to: read the data object from the fast data provider module or from the transaction provider module, incorporate data of said data object into the document, receive via the graphical user interface a user interaction indicating that data of a data object has been entered or amended, and, on response of said indication, send a request the transaction provider to transactionally read said data object from the database; merge the entered or amended data with the read data object; and pass the data object including the entered or amended data to the transaction provider module to transactionally store the entered or amended data in the database.

The modules consistent with the invention may be installed as one or more programs or program modules on different hardware systems (computers or computer systems), and run separately and independently of each other, while in their entirety being capable of performing business transactions in a large enterprise environment or in a "software on demand" environment.

The proposed system and process is supposed to need, compared to current business applications, much less updating operations, which impact many different parts of the business application system and many individual data records or data objects.

The proposed system and process are supposed to minimize the amount of data offered transactionally. The standard way to access data is preferably stateless. The system automatically switches to transactional data provision as soon as the user indicates an updating operation on the graphical user interface.

Additional objects and advantages of the various embodiments of the invention will be set forth in part in the description, or may be learned by practice of the invention. The objects and advantages of the embodiments of the invention will be realized and attained by means of the elements and combinations particularly pointed out in the claims. Embodiments of the invention are disclosed herein and set forth in the claims. The various embodiments can include and/or exclude different aspects, features and/or advantages, where applicable. In addition, various embodiments can combine one or more aspects or features of other embodiments, where applicable.

It is to be understood that both the foregoing general description and the following detailed description are exemplary and explanatory only and are not restrictive of the embodiments of the invention, as claimed. The description of aspects, features and/or advantages of particular embodiments should not be construed as limiting other embodiments or the claims.

Within the concept of this disclosure, the terms used shall have their usual meaning in the context of the field of data processing unless defined otherwise. Particularly, a computer system broadly refers to any stand alone computer such as a PC or a laptop or a series of computers connected via a network, e.g. a network within a company, or a series of computers connected via the internet. Computer systems and programs may be closely related. As used herein, phrases, such as "the computer provides" and "the program provides or performs specific actions", "a user performs a specific action" are used to express actions by a computer system that may be controlled by a program or to express that the program or program module may be designed to enable the computer system to perform the specific action or to enable a user to perform the specific action by means of a computer system.

The term "data object" broadly refers to any date are in a database, which is identified by a key. A data object may be implemented by one or more lines of one or more tables. Data objects are for example used to represent real world entities. In ERP applications they are used to represent business entities such as company, employee, bank account, purchase order, address and the like. They may be stored by means of commercially available database systems. Different data objects may have data of different data types. A certain data type may be uniquely identified by a DataID. So, each piece of data may be characterized by a pair DataType-DataID. Example: the address of a company may have the DataType Address, a DataID 123165424, and the actual content "name—street number—Street—city—zip code—state—country". As can be seen in this example, data types may be structured. A data object may also be composed of other data objects, each having one or more data types.

Further, within the concept of this disclosure, the term "process" shall be interpreted broadly. This means that the term is intended to refer not only to a plurality of actions or commands of program modules or the like, but also to a single action or command.

The term "user interface module" (UI) broadly refers to a set of instructions which allow the creation of a document, which may comprise data of a data object and which may be presented via a graphical user interface (GUI) on a screen to a user. The GUI allows displaying, amending and changing data in data fields. The document may be implemented e.g. by a HTML or XML document, the GUI may be e.g. a conventional browser. In other words: the UI communicates with the GUI.

In an embodiment, the user interface module is capable of creating documents or files, which comprise any data including data objects that it reads from the fast data provider (FDP) module and which documents may be displayed to a user via a graphical user interface. It may also be designed to allow updating operations via the transaction provider module (TP). The user interface module may also connect fields on a screen in the graphical user interface to the data obtained from a data object. The user interface module knows which field relates to which DataType/DataID and may also keep sufficient state information to react to user interactions with the field on the screen, such as through buttons, cursors, mouse pointers, checkboxes, changed field values, and other interactions known to those of ordinary skill in the art.

In an embodiment, the user interface module may request data from the fast data provider module, the transaction provider module, or both. The user interface module may also be equipped with logic to switch between the fast data provider module and the transaction provider module. In an embodiment, the user interface module may include logic to perform consistency checks on data that is entered or amended by, for example, comparing the amended data to other stored data.

The term "fast data provider module" (FDP) broadly refers to a set of instructions and memory, which allow fast reading of data objects. It may also be capable of fast read access to data objects stored in the first database, by techniques such as caching, indexing, and/or replication mechanisms. In other embodiments the fast data provider module may be implemented as a fast search engine such as T-REX® from SAP AG in Walldorf, Germany, which may be a standard source for business data search. The fast data provider may indirectly retrieve from the data base and may be optimized for speed by using caches, pre-calculations, main memory buffers, databases held in main memory, and/or redundant data storage on a plurality of servers. In some embodiments, the fast data provider operates stateless.

The term "transaction provider module" (TP) broadly refers to a set of instructions, which allow transactionally reading and writing data objects in the database. The TP may be designed and configure to perform consistency checks based on business rules and reject changes in case of inconsistencies. The term "transactional" means that a data object is only stored or updated in the data base when it is atomic, consistent and independent. In some embodiments, a data object is stored in its entirety, or if this is not possible, because, for example, one or more tables associated with the data object are locked, the data object is not stored at all. In other embodiments, a data object may only be stored or updated in the database when it is atomic, consistent, and independent. In some embodiments the transactional functionality may be implemented by setting locks on data objects, such as when they are read. A transactional storing process is also commonly referred to as logical unit of work.

The described modules and other embodiments of the invention may be implemented by means of a computer system and software which allows the creation of business software applications and which allows the use of databases or database applications and Internet applications. In an embodiment of the invention, data objects are stored in a relational database system. In a further embodiment, said storing is performed transactionally.

Reference will now be made in detail to principles and exemplary embodiments of the invention by an explanation on the basis of a data processing process, examples of which are illustrated in the accompanying drawings.

Referring now to FIG. 1, an exemplary system is illustrated that contains a user system 101 attached to a screen 114, keyboard 103, and mouse 104; a computing system 102; and, data storage 107. Those skilled in the art will appreciate that some methods, systems and programs consistent with the present invention may apply equally to any computer system, regardless of whether the computer system is a complicated multi-user computing apparatus or a single user device such as a personal computer or workstation. In the embodiment of FIG. 1, computing system 102 contains a processor 105, memory 108, a memory controller 106, and an input/output interface 112, all of which are interconnected via a system bus. The computing system 102 and user system 101 may include various modifications or additions not shown, such as adding cache memory or other peripheral devices. Input/Output interface 112 may contain several interfaces, including an auxiliary storage interface for connectivity to data storage 107, a general input/output interface for connectivity to a network and computers such user system 101, and a terminal interface.

Processor 105 may perform computation and control functions of computing system 102, and comprises a suitable central processing unit (CPU). Processor 105 may comprise a single integrated circuit, such as a microprocessor, or may comprise any suitable number of integrated circuit devices and/or circuit boards working in cooperation to accomplish the functions of a processor. Processor 105 may execute computer programs, such as object-oriented computer programs, within memory 108.

Input/Output interface 112 may contain an interface allowing computing system 102 to store and retrieve information from auxiliary storage devices, such as a magnetic disk (e.g., hard disks or floppy diskettes) or optical storage devices (e.g., CD-ROM). One suitable storage device is a direct access data storage device (DASD) 107. As shown in FIG. 1, data storage device 107 may comprise a hard disk drive which may read programs and data from a hard disk.

Memory controller 106, through a processor, is responsible for moving requested information from memory 108 and/or through input/output interface 112 to processor 105. While memory controller 106 is shown as a separate entity, those of ordinary skill in the art will understand that, in practice, portions of the function provided by memory controller 106 may actually reside in the circuitry associated with processor 105, memory 108, and/or input/output interface 112.

A terminal interface may be included as part of input/output interface 112 to allow system administrators, computer programmers or other end users to communicate with computing system 102, through, for example, screen 114, keyboard 103, mouse 104, and the like or through programmable workstations.

Input/output interface 112 allows computing system 102 via processor 105 to communicate with a network to establish a network connection with user system 101 for sending and/or receiving data. In one embodiment, a plurality of computing systems like computing system 102 can be connected to the same network via each systems input/output interface 112. In such a case, the network computers can be used to increase the computing and processing capabilities of the entire system.

In an embodiment, memory 108 includes an operating system and an application, such as an enterprise resource planning, which application may include module 115 for creating a document 124. Another generic application, such as browser 123, may also be in memory to provide generic functionality for creating a graphical user interface 116 to be displayed on screen 114. The created document 124 may be presented by a browser 123 as a graphical user interface 116 on screen 114. Both the browser 123 and user interface module. Memory 108 may further include transaction provider module 117 and fast data provider module 118, which may have access to data objects 119, as indicated by the broken arrows. Data objects 119 may be stored on data storage 107, via commercially available database systems.

UI 115 User interface module 115 may be configured to exchange messages and data with transaction provider module 117 and fast data provider module 118, as indicated by the solid lines between the modules. User interface module 115 may be further configured to present a GUI 116 including a data field 120, and a save button 121 in the GUI 116 on screen 114, and to receive interactions via input means including keyboard 103 and mouse 104, such as by clicking on save button 121.

It should be understood that memory 108 may comprise "memory" in its broadest sense, and may include, for example, Dynamic Random Access Memory (DRAM), Static RAM (SRAM), flash memory, cache memory, and other forms of known memory. While not explicitly shown in FIG. 1, memory 108 may be a single type of memory component or may be composed of many different types of memory components. For example, memory 108 and processor 105 may be distributed across several different computers that collectively comprise computing system 102. Further, it should also be understood that programs in memory 108 may include any form of computer program, including source code, intermediate code, machine code, and any other representation of a computer program. It should further be understood that data objects 119 may also be stored or buffered in memory like memory 108 as pointed out above.

Figure 2A:
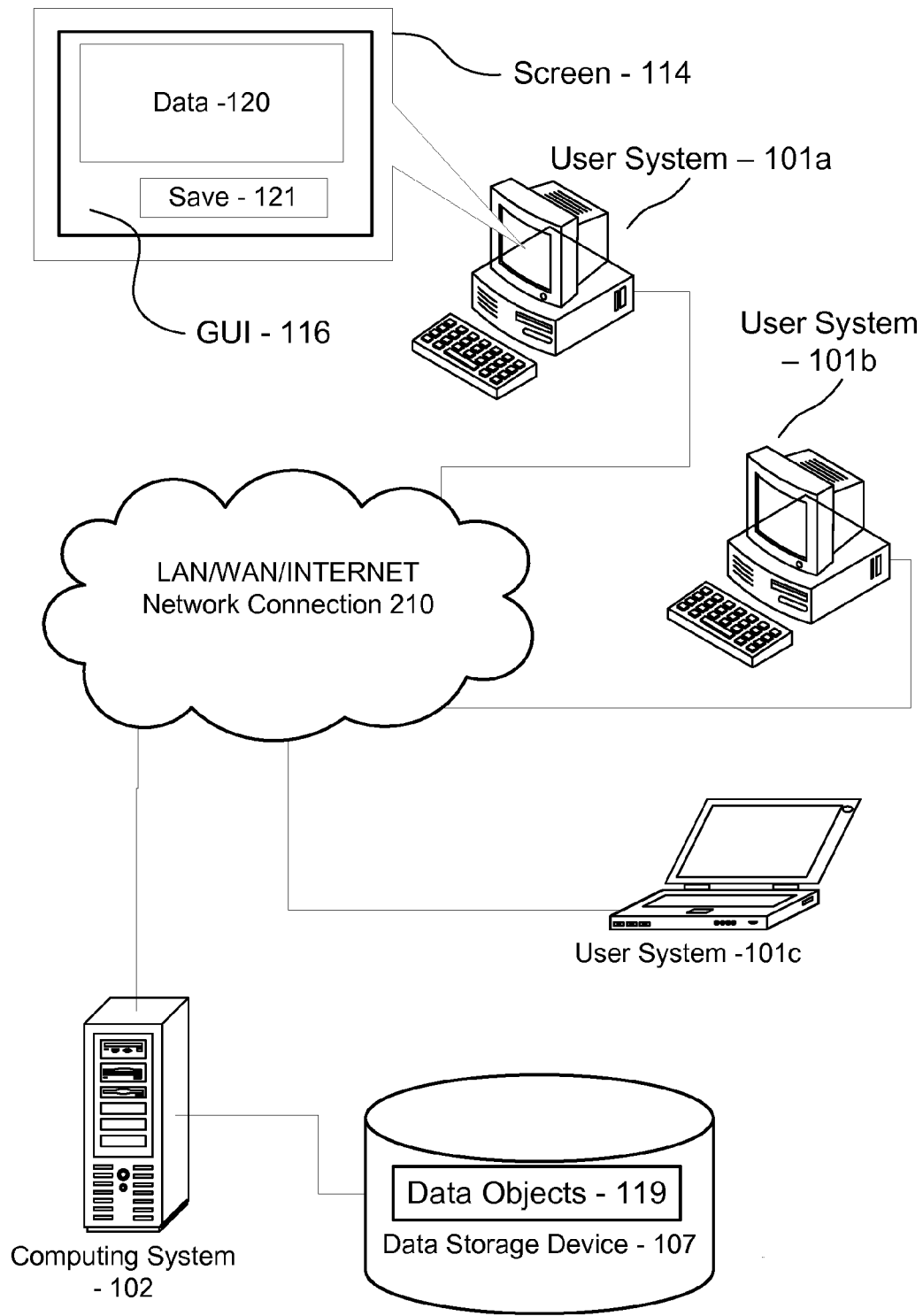
FIG. 2a is a block diagram for illustrating a second implementation of an exemplary computer system consistent with an embodiment of the invention.

Referring now to FIG. 2a, a further embodiment of the invention is illustrated by way of a block diagram of an exemplary computer network. The network in FIG. 2a contains two or more user systems, user systems 101a to 101c, with 101c being a laptop. The user systems are interconnected by a network connection 210, which may be a LAN, a WAN or the Internet or a combination thereof. User systems 101a, 101b and 101c include a browser and may be used by different users, including different users in a company, for inputting data. As an example, a GUI 216 having a data fields 220 and a save button 221 is shown for user system 101a. Computer 201c is implemented as a server and includes all of the elements shown in FIG. 1, and is also connected to data storage 107 containing data objects 119.

In FIG. 2a, various users at user systems 101a, b, and c, are connected to the computing system 102, which is capable of providing on demand access to business application software. FIG. 2a applies as well to a situation, in which three different users (101a,b,c) are logged on to a server 102, which provides an on demand business application software.

Figure 2B:
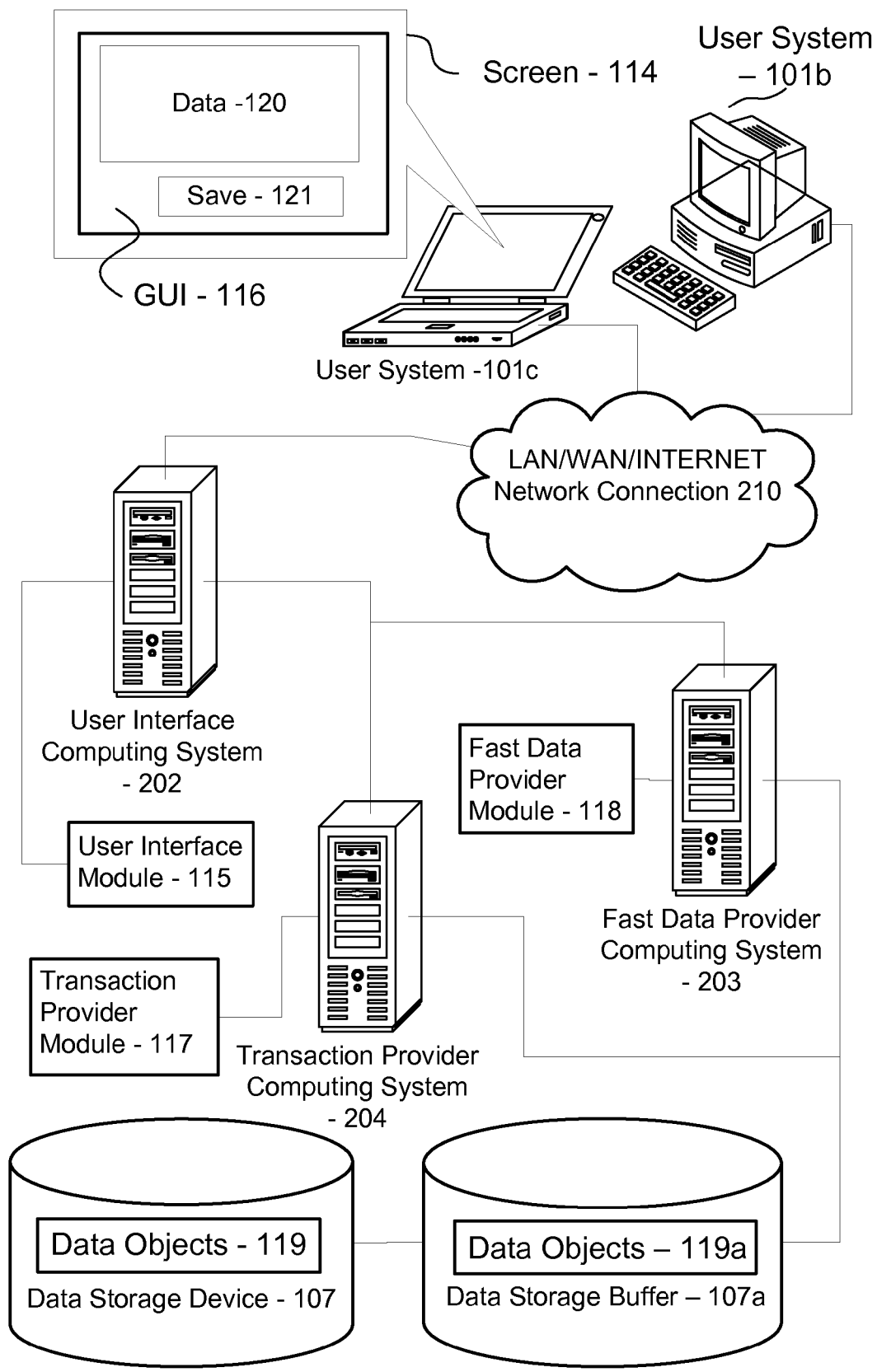
FIG. 2b is a block diagram for illustrating a third implementation of an exemplary computer system consistent with an embodiment of the invention.

FIG. 2b shows a further embodiment of the invention illustrated by way of a block diagram of an exemplary computer network. In this embodiment, the network comprises two or more user systems, such as 101b and 101c, 101c being a laptop, interconnected by a network connection 210, which may be a LAN, a WAN or the Internet or a combination thereof. User systems 101b and 101c may include an application, such as browser 123, and may be used by different users for inputting data. As an example, GUI 116 having data field 120 and save button 121 is shown on screen 114 for laptop 101c. The network may also comprises a plurality of server computer systems 202, 203, and 204. In this embodiment, user interface module 115, fast data provider module 118 and transaction provider module 117 run on computing systems 202, 203, and 204, respectively. The fast data provider computing system 203 may also connect to a data storage buffer 207a for data storage device 207. Data object copies 119a of data objects 119 may be stored in buffer 207a. Buffer 207a may be held in volatile memory, for fast data access. Buffer 207a may be implemented as a database held in the main memory.

In a further embodiment, transaction provider module 117 and fast data provider module 118 may run on the same computing system. In a further preferred embodiment, a plurality of transaction provider modules 117 and fast data provider modules 118 may run on a plurality of servers, depending on the workload.

Figure 3A:
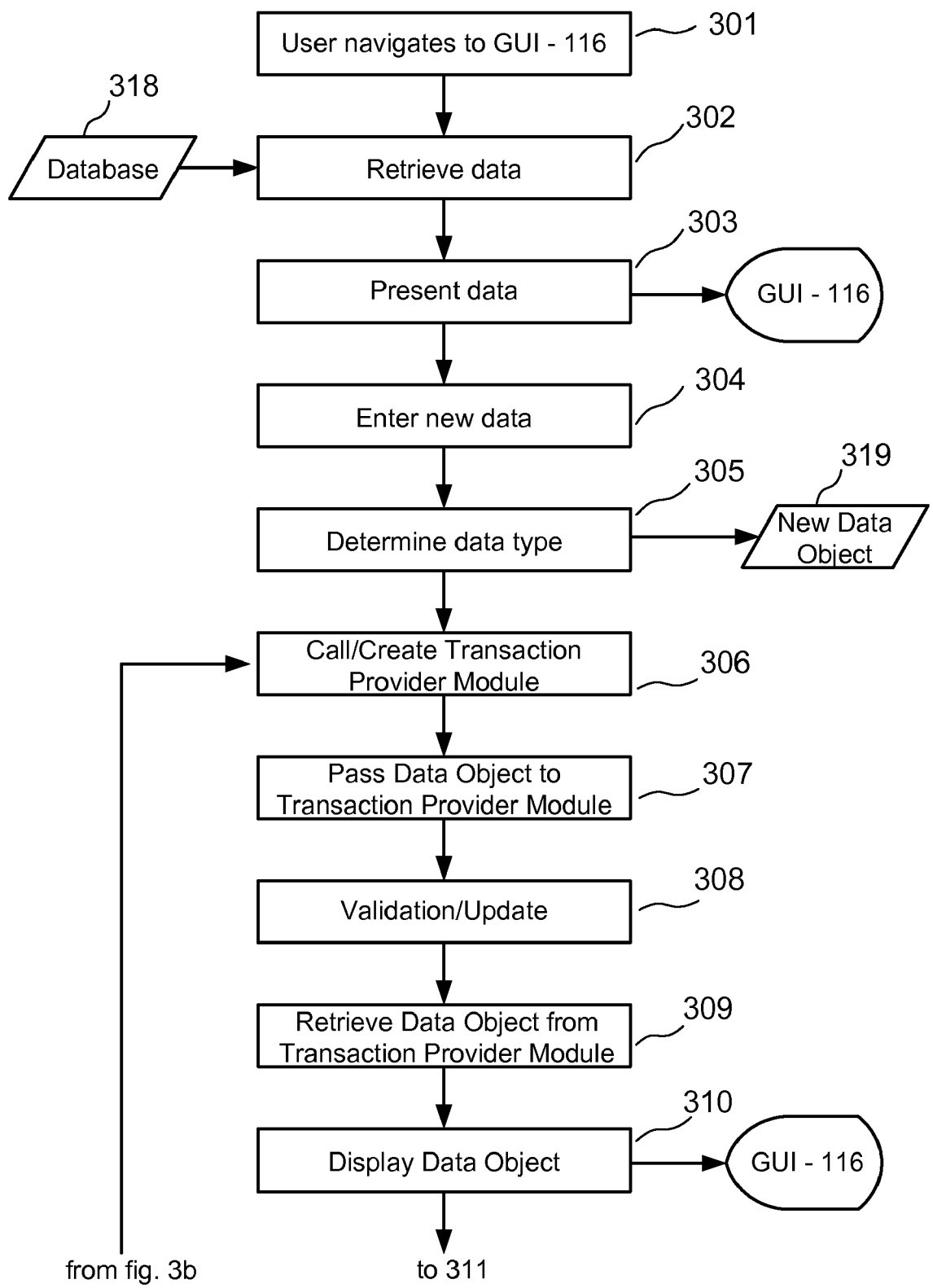
FIGS. 3a and 3b show a flow diagram for illustrating a first process consistent with an embodiment of the invention.
Figure 3B:
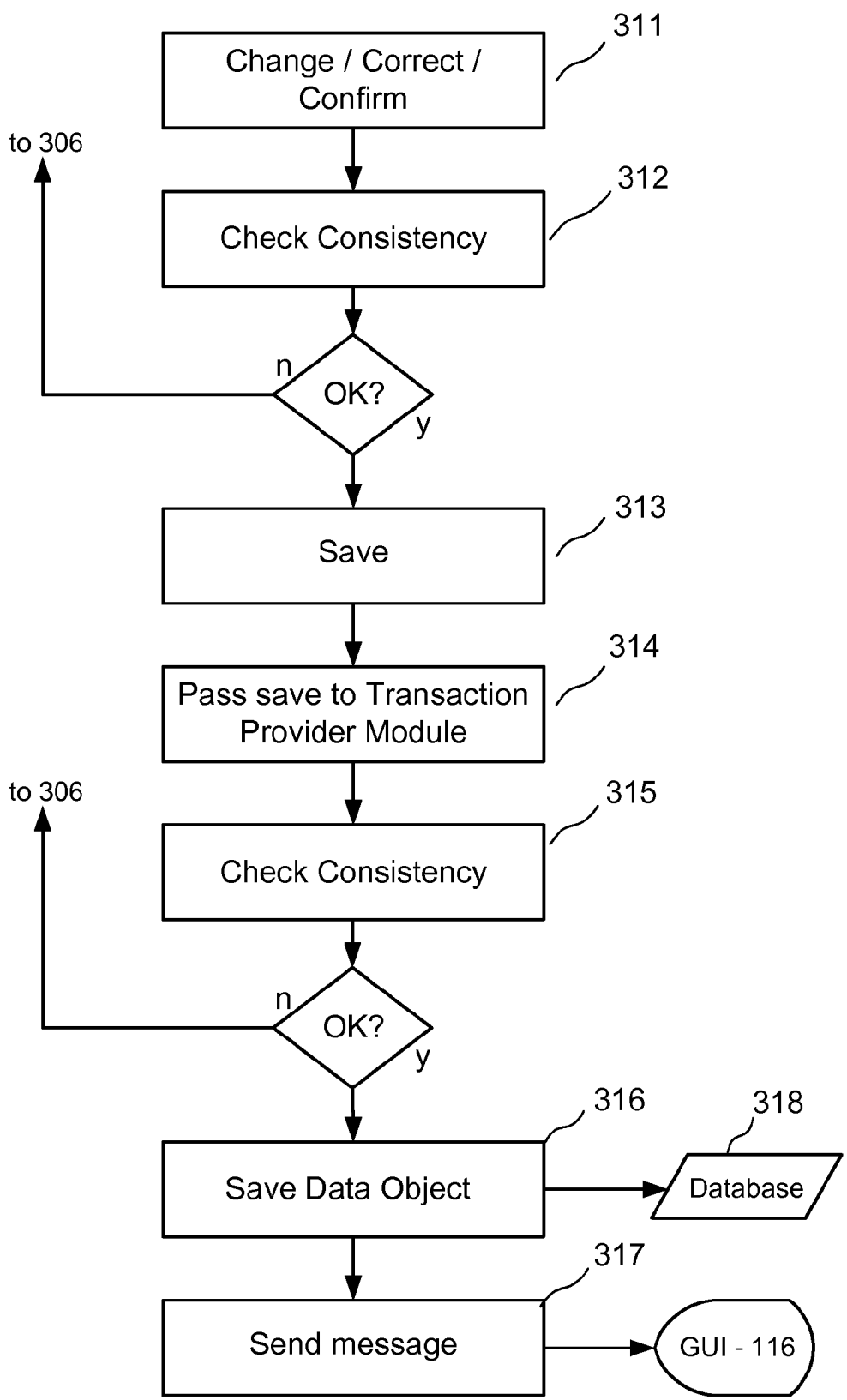

Referring now to FIGS. 3a and 3b, a further embodiment of the invention is illustrated by way of a flow diagram of an embodiment of the invention in the form of a process. Using a computer system according to the architectures of FIGS. 1 and/or 2, a typical user session in a data creation case and the corresponding component behavior may be as follows:

In a step 301 a user may navigate to a graphical user interface, GUI 116, provided by a browser 123, which may be based on a document created by user interface module 115 on a computing system 102, 202, 203, or 204, or user system 101. The navigation in step 301 broadly refers to a "global" navigation that starts a new session context with an own UI and TP. Within that session context, "local" navigation may be possible, for example to a subscreen on a tab or to the details of a table line. Local navigation stays in the same session context and works with the same UI and TP.

On request by user interface module 115, fast data provider module 118 may statelessly retrieve in step 302 all relevant data to initially fill the screen from a database 318, comprising, for example, a repository. Relevant data may comprise one or more fields of a data object including the respective metadata, the descriptors of the fields and context information. Context information may comprise textual or business information about the data object and also business or textual information about other data objects that may be read from data storage 107 or data storage buffer 107*a*. Other data objects may be of the same type of the respective data object (e.g. in case of a list type display) or of a different type.

In step 303, the relevant data may be presented to the user via GUI 116. When a new data object is created, a data object of a specific type may be shown with empty fields.

In step 304, the user may enter new data in data field 120.

In step 305, user interface module 115 may determine the appropriate DataType and may create a corresponding data object 119 including information about the object, for example a data object of DataType A and DataID X and including respective data values. This is denoted A/X in short for the further explanation. The DataId may alternatively also be determined after step 305 by the transaction provider module 117.

In step 306, user interface module 115 may call or create a transaction provider module 117, including a transactional buffer for intermediate storage of data objects.

The new data object A/X and the data content may be passed to the transaction provider module 117 for validation and processing in step 307.

The transaction provider module 117 may store A/X in its transactional buffer and may perform validation/processing in step 308. This may change the data content of A/X.

In step 309, user interface module 115 may retrieve A/X from transaction provider module 117. User interface module may also retrieve error messages in case of errors.

In step 310, the user interface module 115 may display the updated content of A/X and the error messages, if applicable, via GUI 116.

In step 311, the user may change or correct or confirm A/X.

A further consistency check may be added in step 312 to reveal inconsistencies. When this further check is added, changes may be passed via user interface module 115 to transaction provider module 117 and processed as described in steps 306 to 310.

When the user is satisfied with the data content and any inconsistencies have been resolved, the data may be saved in step 313. To save the data, user interface module 115 may pass the save request to the transaction provider module 117 in step 314 to persistently store the data.

In step 315 transaction provider module 117 may ensure data consistency and may reject the save request; this leads back to step 306. In some embodiments, this additional data consistency check may reduce the risk of storing inconsistent data because data objects relating to saved data might have been changed by other processes.

If the data A/X are consistent, transaction provider module 117 may transactionally saves A/X to the database 318 on data storage 107 in step 316.

In step 317, a success message may be passed to the user via user interface module 115 and GUI 116.

Figure 4B:
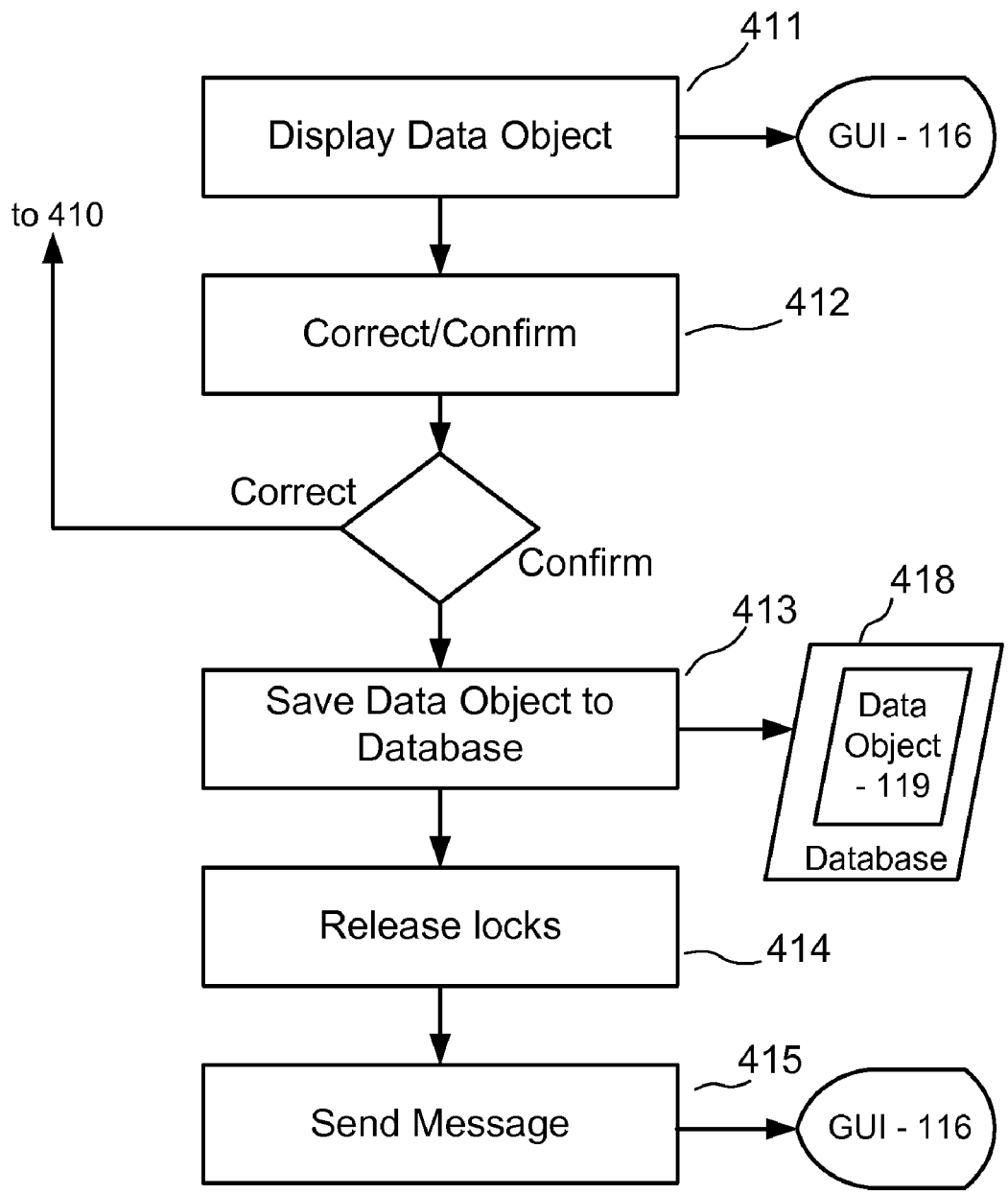

Referring now to FIG. 4, a further embodiment of the invention is illustrated by way of a flow diagram of an embodiment of the invention. FIG. 4 shows a sequence of user interaction in a data change case and the corresponding component behavior:

In a step, 401, a user may navigate to a GUI 116 provided by user interface module 115 via a created document 124 as previously described.

In step 402, the user interface module 115 may retrieve all or part of the relevant data of a data object 119 statelessly via fast data provider module 118 and may initially fill the GUI 116 including data fields 120 with all or part of the data from data object 119. The retrieved data may also be buffered as described in FIG. 2*b*, including buffer 207*a* with buffered data object copies 119*a*. Retrieving the data may include determining the appropriate DataType and corresponding DataID of data object 119, such as DataType A and DataID X.

In step 403, the user may change data object 119 in data field 120.

In step 404, the user may interact with GUI 116 thereby indicating that a changed data object should be saved, such as by clicking on a save button or other appropriate action.

Triggered by the user interaction in step 404, user interface module 115 may compare the data from the GUI 116 with the data from the fast data provider module 118. If the data has been changed, a transaction provider module 117, including a transactional buffer, may be called or created in step 405. A transaction provider module 117 may be created by creating main memory representations for transaction provider module 117 through software.

In step 406, user interface module 115 may request transaction provider module 117 to read the data object 119 from database 418.

After having successfully set a lock on the requested data object 119, transaction provider module 117 may transactionally read the data object 119 from database 418 in data storage 107 during step 407. If the data object 119 is already locked by another process, no lock can be acquired for that data object 119. In that case, an appropriate message may be passed to the user via GUI 116. The user may then choose to cancel, which may cause the data changes to be discarded, the GUI 116 to be closed, and/or user interface module 115 and transaction provider module 117 to be terminated. Alternatively the user may wait and resend the changed data when the lock is released.

In step 408, transaction provider module 117 may store the content of the data object 119 in its transactional buffer.

In step 409, user interface module 115 may compare the content of the data object 119 from transaction provider module 117 with the content originally provided by the fast data provider module 118. If there is a deviation, user interface module 115 may merge the content from transaction provider module 117 with the user changes on the screen data fields 120 in step 404.

In step 410, user interface module 115 may pass the changed data content of the data object 119 for validation and/or processing to transaction provider module 117. Transaction provider module 117 may store the updated data object 119 in its transactional buffer and may perform some validation and/or processing operations. This may cause additional changes of the data content of the data object 119.

In step 411, the merged and updated data content may be shown to the user together with a message asking the user for confirmation. In case of deviations mentioned above, a message text, e.g. "Data A was changed recently in another transaction. Please check your updates," may be shown.

In step 412, the user may change or correct or confirm the data. The process may go back to step 410.

If no error has occurred, the amended data object 119 may be stored in the database 418 in step 413.

After a successful save the acquired lock may be released in step 414.

In step 415, a success message may be passed to the user via the GUI 116.

The description of user interaction in the previous sections does not necessarily completely cover the end or all details of a user interaction. Further types of actions closing the process may be possible, e.g.:

Cancellation: All data changes that were not saved are discarded. The user interface module 115 and transaction provider module 117 corresponding to the screen are terminated. The session context is terminated. The screen is closed.

Save and Close: After a successful save no data changes are possible any more. The session context, user interface module 115 and transaction provider module 117 are terminated. The screen displays a confirmation of the successful save. The user closes the screen.

Save and Continue: After a successful Save, the user may continue to work on the same screen. The session context is partly kept. The user interface module 115 updates its store of "old" data content with the result of the Save operation by requesting the actual content from the transaction provider module 117. Afterwards the transaction provider module 117 is terminated. The user can continue to work on the screen.

An advantage of disclosed architecture lies in the decoupling of its components that allows optimization of each component to its own primary target without impairing other targets that are cared for by other components.

Fast data provider module and transaction provider module focus on fast data provision and user support independent of transactional integrity considerations. To achieve that, a great variety of techniques can be applied, ranging from main memory caches to load distribution across a big number of relatively independent machines.

Furthermore, overall performance and user experience may be improved through the invention by enabling: fast start of user interface screens with rich data content; automatic switch to transactional behavior in case of data changes; no explicit switch from display to edit mode by the user; session state is kept only in the user interface module and transaction provider module; only the absolute necessary state may be kept transactionally in the transaction provider module; per-user quantity of buffered data is greatly reduced to user interface module and transaction provider module; fast data provider module buffers may be used system-wide.

The invention may be implemented in a context with some type of "optimistic locking" mechanism that works with a minimal number of actual locks.

Note that while embodiments of the present invention are described in the context of a fully functional computer system, those skilled in the art will appreciate that modules of the present invention are capable of being distributed as a computer program product in a variety of forms, and that embodiments of the present invention apply equally regardless of the particular type of signal bearing media to actually carry out the distribution. Further examples of signal bearing media include: recordable type media such as floppy disks and CD ROMs, and transmission type media such as digital and analog communication links, including wireless communication links.

Modifications and adaptations of the present invention will be apparent to those skilled in the art from consideration of the specification and practice of the embodiments and features disclosed herein. The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include a combination of software and hardware, but some systems and methods consistent with the present invention may be implemented in software or hardware alone. Additionally, although aspects of the present invention are described as being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Further, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

Other embodiments of the invention will be apparent to those skilled in the art from consideration of the specification and practice of the invention disclosed herein. It is intended, therefore, that the specification and examples be considered as exemplary only, with a true scope and spirit of the invention being indicated by the following claims.

What is claimed is:

1. A computer system for processing a data object comprising:

a storage device containing a database for storing a plurality of data objects;

a user interface module configured to present data to a user via a graphical user interface on a screen;

a fast data provider module configured to statelessly read upon request from the user interface module the data object from the database by treating the request as an independent transaction and provide the data object to the user interface module without retaining any session state information and without locking the data object;

a transaction provider module configured to read the data object from the user interface module, to lock the data object while reading from and writing to the database, the locking preserving consistency and atomicity, and to perform a consistency check between the data object read from the user interface module and the database;

wherein the user interface module is further configured to:
initially read the data object from the fast data provider module, incorporate data initially read from the fast data provider module into the graphical user interface, receive a user interaction indicating that data in the graphical user interface has changed and, on response of said indication, compare the data object in the fast data provider module to the data in the graphical user interface to identify whether the graphical user interface data incorporated from the data object has changed;

if the graphical user interface data incorporated from the data object has changed:

create a buffer in memory instantiating the transaction provider module;

send a request to the transaction provider to lock and transactionally read said data object from the database causing the transaction provider to store the transactionally read data object in the buffer;

compare the transactionally read data object stored in the buffer to the data object in the fast data provider module to identify whether the data object stored in the buffer is identical to that in the fast data provider module;

if the data object stored in the buffer is not identical to that in the fast data provider module, send a request to the transaction provider module to release the lock, otherwise, merge the changed data in the graphical user interface relating to the data object into the data object stored in the buffer; and send a request to the transaction provider to store the merged data object in the database and release the lock.

2. The computer system of claim 1, wherein the database is a relational database.

3. The computer system of claim 1, wherein the fast data provider module comprises at least one of a caching and a replication mechanism.

4. The computer system of claim 1, wherein the user interaction comprises initiating a save function in the graphical user interface.

5. The computer system of claim 1, wherein the user interaction comprises activating a data field via the graphical user interface.

6. The computer system of claim 1, wherein the user interaction comprises moving a cursor in a data field in the graphical user interface.

7. The computer system of claim 1, wherein the user interface module, the fast data provider module and the transaction provider module are distributed over a plurality of interconnected servers.

8. A computerized method for updating a data object in a database comprising:

receiving, via a graphical user interface and a user interface module, a request to display data from the data object;

sending, via the user interface module, a request for said data object to a fast data provider module;

statelessly reading, by means of the fast data provider module, the data object from the database by treating the request as an independent transaction without retaining any session state information and without locking the data object in the database;

displaying data from said data object via the graphical user interface;

receiving an indication that the displayed data has been changed; and, responsive to said received user interaction:

comparing the data object read by means of the fast data provider module to the data in the graphical user interface to identify whether the graphical user interface data incorporated from the data object has changed;

if the graphical user interface data incorporated from the data object has changed:

creating a buffer in memory instantiating the transaction provider module;

requesting, via the user interface module, the transaction provider to lock and transactionally read said data object from the database causing the transaction provider to store the transactionally read data object in the buffer while preserving consistency and atomicity of said data object;

comparing the transactionally read data object stored in the buffer to the data object in the fast data provider module to identify whether the data object stored in the buffer is identical to that in the fast data provider module;

if the data object stored in the buffer is not identical to that in the fast data provider module, send a request to the transaction provider module to release the lock, otherwise, merging the changed data in the graphical user interface relating to the data object into the data object stored in the buffer; and send a request to the transaction provider to store the merged data object in the database and release the lock.

9. The method of claim 8, further comprising: performing a consistency check between the amended data object and the transactionally read data object and, when the consistency checks reveal no error, updating the data object in the database on the basis of the amended data object.

10. The method of claim 8 wherein the user interaction comprises initiating a save functionality in the graphical user interface.

11. The method of claim 8 wherein the user interaction comprises activating a data field via the graphical user interface.

12. The method of claim 8 wherein the user interaction comprises moving a cursor in a data field in the graphical user interface.

* * * * *